Nov. 7, 1944. C. E. MEYERHOEFER 2,362,110
LAMP
Filed July 11, 1942 4 Sheets-Sheet 1
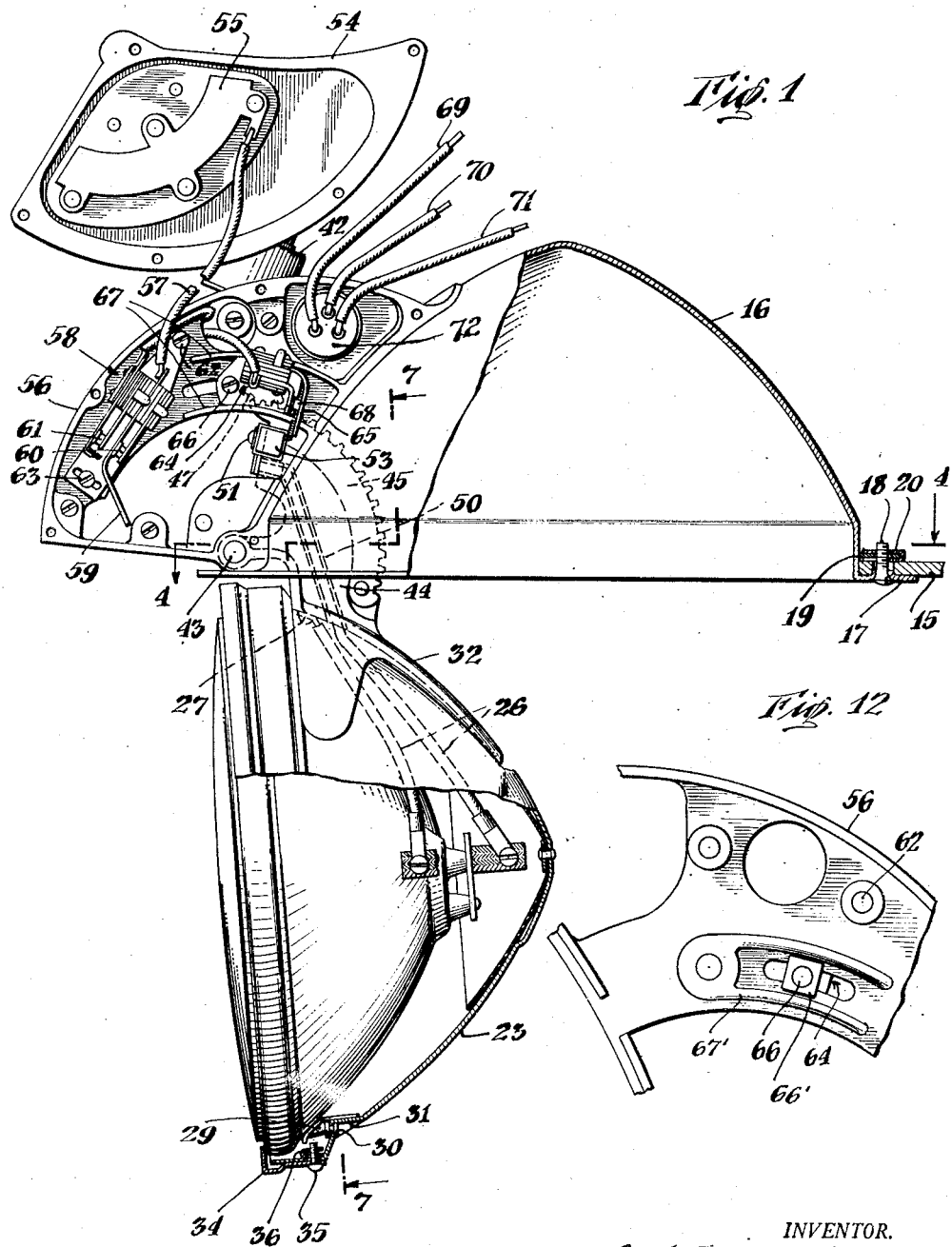
INVENTOR.
Carl E. Meyerhoefer
BY
ATTORNEYS

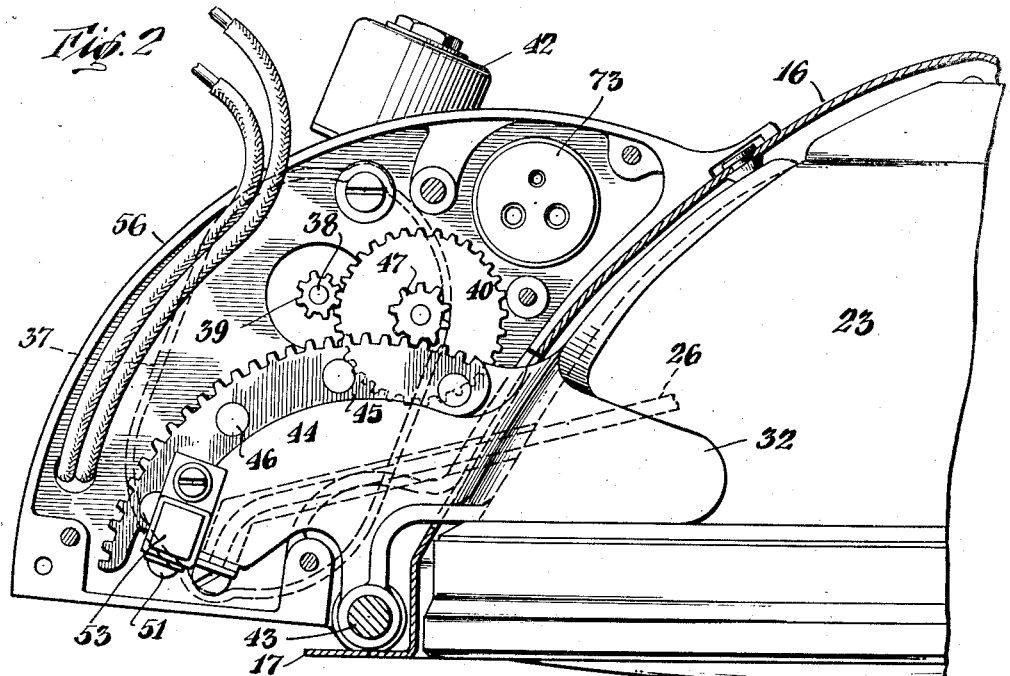
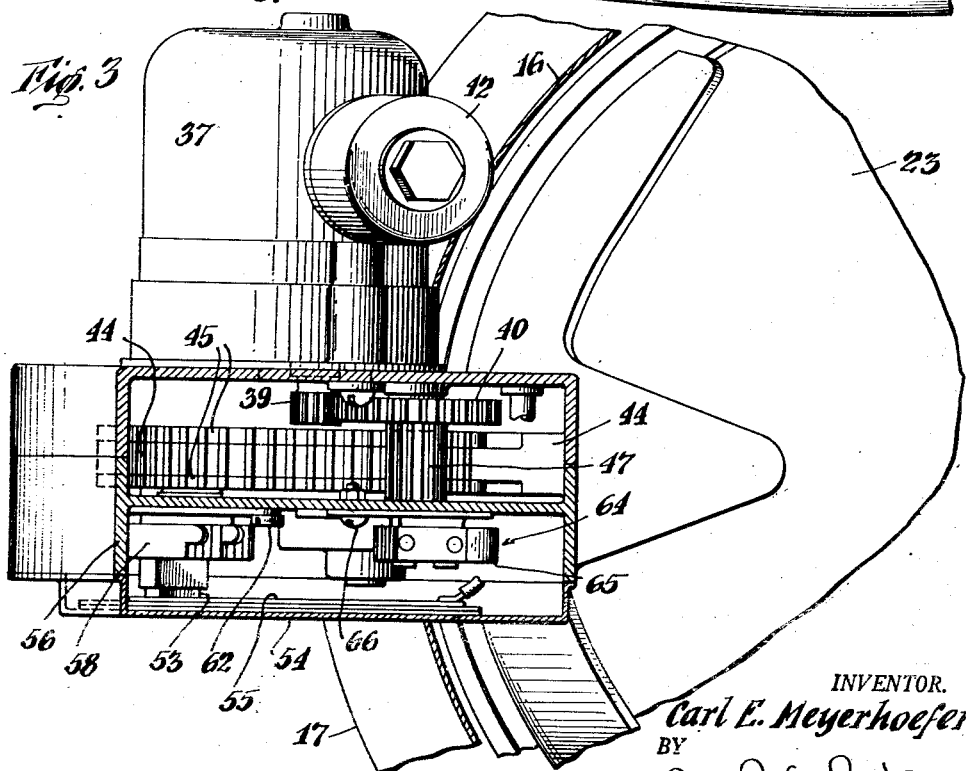

Nov. 7, 1944.  C. E. MEYERHOEFER  2,362,110
LAMP
Filed July 11, 1942   4 Sheets-Sheet 3
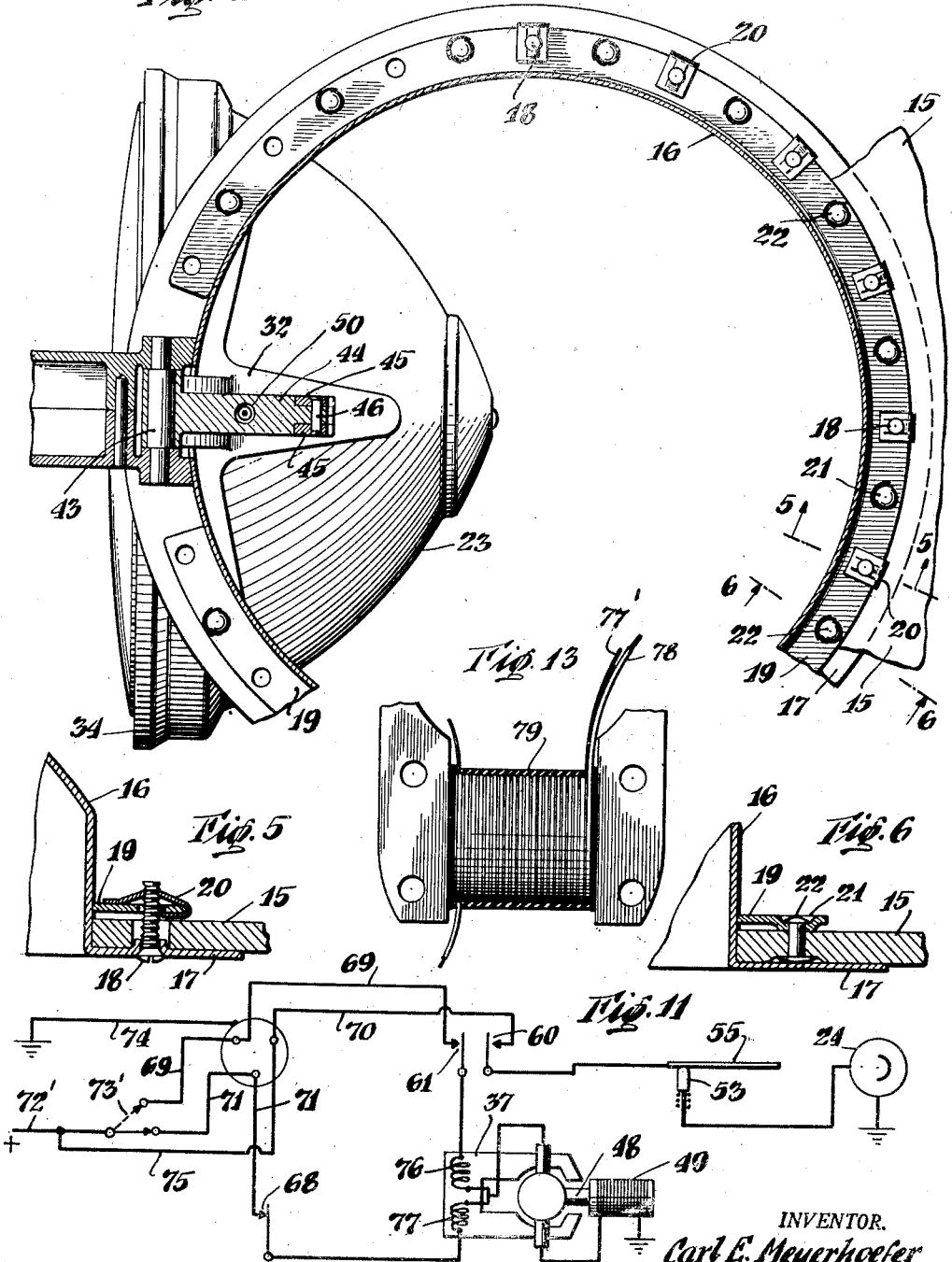
INVENTOR.
Carl E. Meyerhoefer
BY
ATTORNEYS Nov. 7, 1944.  C. E. MEYERHOEFER  2,362,110
LAMP
Filed July 11, 1942  4 Sheets-Sheet 4
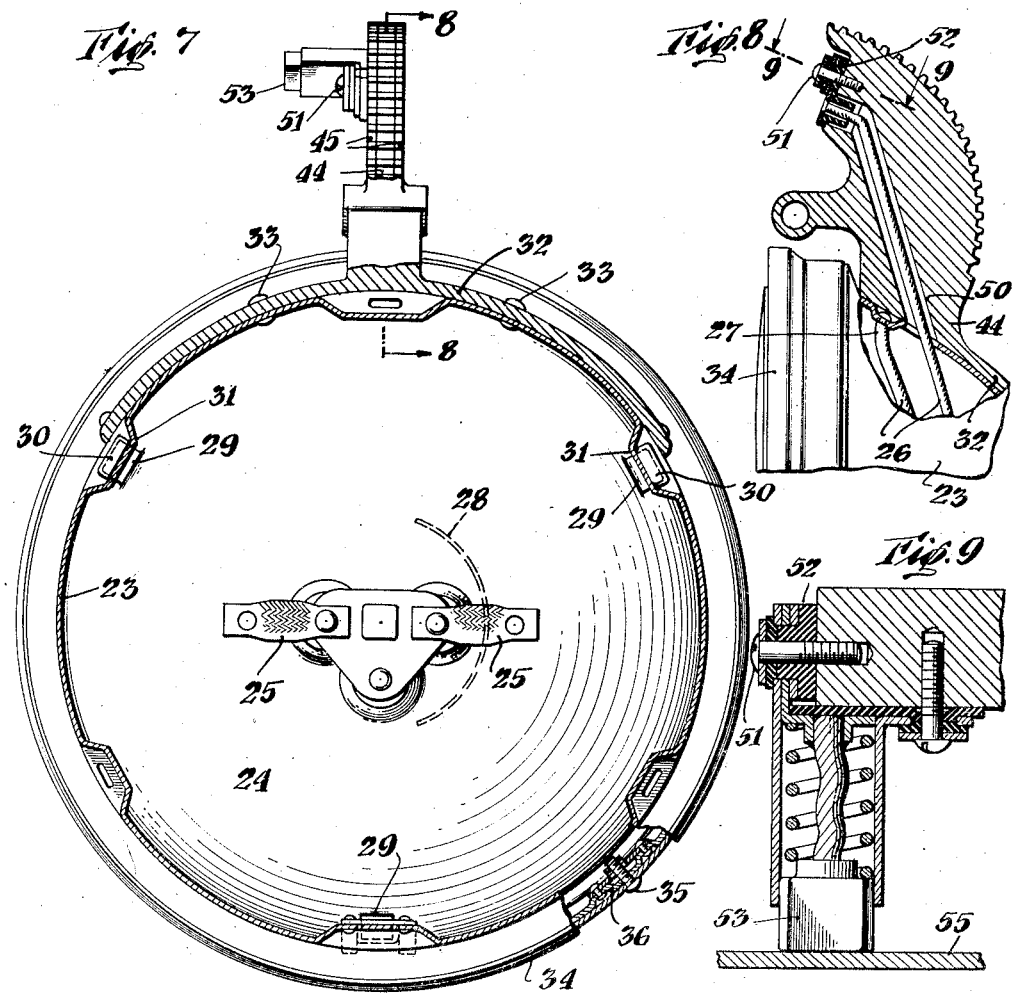
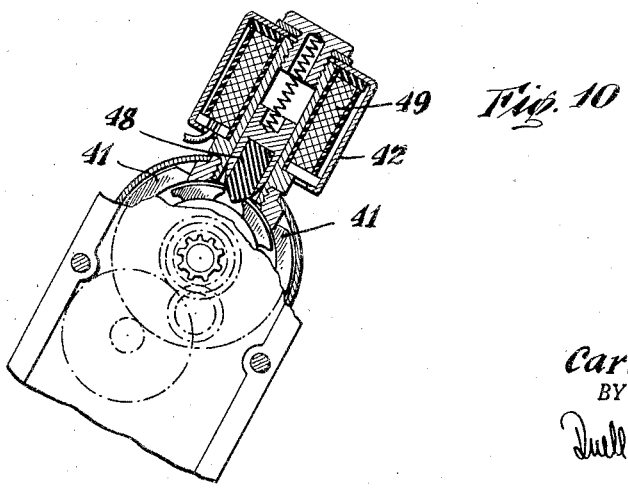
INVENTOR.
Carl E. Meyerhoefer
BY
ATTORNEYS Patented Nov. 7, 1944

2,362,110

UNITED STATES PATENT OFFICE 2,362,110

LAMP

Carl E. Meyerhoefer, Brooklyn, N. Y., assignor to E. A. Laboratories, Inc., Brooklyn, N. Y., a corporation of New York Application July 11, 1942, Serial No. 450,561

3 Claims. (Cl. 240—7.7)

This invention relates to a structurally and functionally improved lamp and in its more specific aspects aims to provide a unit of this character which may be advantageously employed in connection with aircraft and in similar installations.

It is well understood that it has been customary to associate with aircraft, and especially airplanes, lamps which are employed to assist a pilot in effecting a landing in the darkness. These lamps are of two general types, the first of which is ordinarily affixed to the body of the vehicle and against movement with respect to the same. Such lamps are ordinarily housed within the leading edge of the wing and project through a transparent panel or lens portion which, in effect, forms a part of such leading edge. The second class of lamp is usually movably supported by the wing or similar structure of the aircraft. The latter type of lamp is ordinarily housed within the wing and may form a part of the airfoil surface. When operative, it is shifted to occupy a position beyond the body of the wing and may, for example, assume a final position where its light beam is directed precisely in the path which the aircraft is to traverse.

In many respects, the latter type of lamp or light is to be preferred over the first type. It is capable of being housed wholly within the wing surface—so that it does not offer any parasitic drag under ordinary flight conditions— and does not require any interruption to the structure of the leading edge of the wing, in that this lamp may be positioned to the rear of such edge. Moreover, this lamp offers the advantage that it may ordinarily be constructed in a manner such that it may be held immovably in any position between the fully housed one and the one at which its rays will be directed immediately ahead of the aircraft. Consequently, it is feasible to illuminate the terrain being traversed by the aircraft or to use the lamp for other purposes and where it would be visible from the ground without it being necessary for the plane to follow other than a horizontal or, in fact, an upwardly inclined path.

Lamps of this character have, however, offered the disadvantage that they have been relatively complicated in structure and expensive to manufacture. Additionally, their operating mechanism has not been particularly suitable for adaptation to present high speed planes and where the wind resistance to which the lamp is exposed (under operative conditions) is very high. Moreover, the mechanism has tended to fail in one or more of its operating details after the lamp has functioned a number of times.

Thus, it is an object of the present invention to provide a lamp which may be employed in numerous different associations but is of particular value when utilized in connection with aircraft, and especially airplanes; the lamp and its associated parts being of relatively rugged construction and operating over long periods of time with freedom from all difficulties. Additionally, a lamp constructed in accordance with the teachings of the present invention is capable of being manufactured at a relatively nominal figure and may be serviced by unskilled labor.

Another object of the invention is that of furnishing a unit of this type which may readily be installed in an aircraft and when so installed will be under the ready control of the pilot or other operator. In such control, it will be feasible to effect a shifting of the lamp almost instantaneously from fully retracted to fully projected position and to also arrest the lamp at any desired intermediate position which it will continue to occupy as long as the operator maintains such adjustment.

With these and other objects in mind, reference is had to the attached sheets of drawings illustrating one practical embodiment of the invention, and in which:

Fig. 1 is a partly sectional side view of a lamp with certain portions removed and other parts broken away to disclose underlying constructions;

Fig. 2 is an enlarged fragmentary sectional view of certain of the parts as shown in Fig. 1 but with these parts in a different position of adjustment;

Fig. 3 is a transverse sectional view of the mechanism as shown in Fig. 2;

Fig. 4 is a sectional plan view of the parts taken along the lines 4—4 and in the direction of the arrows as indicated in Fig. 1;

Figs. 5 and 6 are transverse sectional views taken along the lines 5—5 and 6—6 respectively and in the direction of the arrows as indicated in Fig. 4;

Fig. 7 is a sectional rear view along the lines 7—7 and in the direction of the arrows as indicated in Fig. 1;

Fig. 8 is a sectional view along the lines 8—8 and in the direction of the arrows as indicated in Fig. 7;

Fig. 9 is an enlarged transverse sectional view along the lines 9—9 in the direction of the arrows as indicated in Fig. 8;

Fig. 10 is a partly sectional fragmentary view of certain of the operating mechanism of the assembly;

Fig. 11 is a diagrammatic view of the circuit layout which is preferably included in a unit of this type;

Fig. 12 is a fragmentary rear view of one part; and

Fig. 13 is an enlarged view of the motor coil.

As afore brought out, a lamp embodying the present invention is preferably employed in association with aircraft. Accordingly, in Figs. 1, 4, 5 and 6, the reference numeral 15 indicates the supporting surface or skin which may form a part of the lower wing surface of a plane. This surface is formed with an opening of an area adequate to receive the housing 16. Preferably, the latter is formed with an outstanding flange 17 to lie in face-to-face contact with the surface 15. The flange is formed with a series of openings through which the bodies of bolts 18 extend. A retaining ring 19 may be disposed in contact with the inner face of the skin 15 and be provided with openings which align with the openings through the latter as well as the openings formed in the flange 17. Nuts 20 may be associated with the ring 19 and to receive the shanks of the bolts 18. Accordingly, upon the latter being tightened, the housing 16, together with any parts associated with the same, are immovably retained against displacement with respect to the mounting surface.

As is clearly brought out in Fig. 5, nuts 20 are preferably of the sheet metal and quick-attaching type. They remain in association with the ring 19 or its equivalent due to their configurations and engagement with the ring surfaces. Accordingly, the ring and nuts will ordinarily remain as one unit ready to receive the bolts 18. In order to prevent a movement of the ring 19 with respect to the surface 15, it is preferred to anchor these parts one to the other. As especially shown in Fig. 6, this may be accomplished by employing rivets 22 and forming the ring with openings adjacent which the ring surface is depressed as indicated at 21. Thus, as shown in Fig. 4, the ring and nuts carried thereby are mounted substantially permanently in place but at the same time an operator, by simply loosening the bolts 18, may detach the housing 16 together with any associated parts.

The housing 16 normally encloses a shell 23 which, in turn, mounts a bulb-reflector unit 24. The latter may be of the "sealed" type and be provided with filaments (not shown) and with terminals 25 from which current-supplying leads 26 extend. One of these leads may be grounded to the shell 23 as indicated at 27. Also, it will be observed, in Fig. 7, a semi-circular shield 28 may form a part of unit 24 and in order to prevent light rays being distributed to one side of the unit.

As will be appreciated, two of these lamps are ordinarily mounted by an airplane, one in association with the left or port wing section and the other in association with the right or starboard wing. The pilot of the plane will ordinarily occupy a position somewhere between the two lamps. It is for the purpose of shielding his eyes from unnecessary glare that the shields 28 are provided, in that these shields are to extend toward the pilot. To manufacture lamp units designed solely for application to the left or the right wing section would require considerable duplication of expense. The same would be true of the light-producing unit 24. Therefore, the present apparatus has been designed so that the several parts may be assembled to provide a lamp structure which may be applied to either wing and according to the manner in which it is assembled. Likewise, according to the manner in which the unit 24 is mounted in the shell, it will serve the desired purpose.

In order to furnish a structure which will optionally provide the desired assembly, it will primarily be noted that unit 24, in the embodiment illustrated, is provided with three rearwardly extending lugs 29. These lugs are accommodated by recesses 31 which preferably form an integral part of shell 23. As will be observed, six of these pockets or portions are formed in the shell. Obviously, a greater or lesser number might be furnished and dependent upon the number of lugs or projections 29 which form a part of unit 24. Each of the pockets may be formed with an opening to receive a grommet 30. The entire shell is mounted by a bracket 32 to which it is conveniently secured by means of rivets 33. The shell is secured with respect to the bracket in the manner shown, for example, in Fig. 7. This will be regardless of whether the lamp is to be applied to the port or starboard side of the plane. With the unit 24 mounted in the shell, it is apparent that three of the pockets 31 will be free of corresponding lugs 29. This is as also shown in Fig. 7. Assuming, however, that the unit 24 as shown in the figure in question is removed from the shell and turned 180°, it will be seen that under such circumstances the shield 28 will now extend to the left hand side of the center and that those pockets which heretofore had received lugs or projections 29 will now be vacant, while the uppermost pocket and the two pockets 120° spaced therefrom will now receive these projections. It accordingly follows that, without any change in manufacturing methods or in tools or dies, the lamp will be equally adaptable for mounting in either wing of the plane.

To secure the unit against displacement with respect to the shaft, it is primarily to be remembered that a turning of the same is precluded incident to the pockets and the projections received thereby. A bezel or clamping ring 34 is brought to a position where it overlies the unit 24 and more particularly the edge portion thereof, as well as the adjacent edge of the shell 23 and after the unit 24 has been caused to assume the position shown in the drawings. Both the shell and the ring are formed with openings and these under the circumstances outlined will be in partial alignment. Now, by simply pressing the ring 34 into increasing telescopic relationship with respect to the shell, this ring will bear against the outer edge of unit 24 and force the projections 29 of the latter into intimate contact with the grommets 31 and to compress the latter. Sufficient pressure will result in an alignment of the openings in the bezel or ring and the shell and, whereupon, it will be feasible to introduce the bolts 35 through these openings. As shown in both Figs. 1 and 7, nut members 36 are preferably secured against displacement with respect to the shell and in line with the openings which receive the bolt 35. Accordingly, the latter may be tightened with the parts properly disposed with respect to each other. Under these circumstances, the shell and the lamp will, in effect, provide one unit.

As previously brought out, the housing 16 is at all times (barring removal for inspection and repair) to remain a fixed part of the plane. The shell 23, together with the unit 24, however, is to be movable with respect to the housing and its associated parts. It is intended that it shall be capable of occupying a housed position substantially within the wing as shown in Fig. 2 or be capable of being swung outwardly to or even beyond the position shown in Fig. 1. In order to achieve these results and also in order to arrest the movement of the movable portion of the assembly at any desired point, a motor is employed and a brake mechanism may form a part of the assembly.

As shown especially in Figs. 2 and 3, the motor may include a casing 37 from which a drive shaft 38 extends. Secured to this shaft is a pinion 39, which may mesh with the teeth of gear 40 to thus provide a reduction drive. Any desirable number of additional components (not shown) may be employed to still further reduce the speed of drive should this be desired. The motor, as illustrated in Fig. 10, may include field pieces 41. These pieces or poles are conveniently spaced in the usual manner and a casing 42 may extend from the motor casing at this point.

As shown especially in Figs. 2 and 3, the bracket 32 may be drilled to receive a pivot pin 43. This bracket (in order to reduce unnecessary weight) may be formed of an aluminum alloy. It is provided with a rearwardly extending portion 44. Within the latter teeth are formed. It will be realized that, under ordinary usage, these teeth would wear rapidly in view of the material employed. Therefore, in order to provide a suitable wear-resistant structure at this point, plates 45 may be affixed to the different side faces of the extension 44 and secured in position, for example, by rivets 46. With the parts so assembled, teeth may conveniently be simultaneously broached in both the plates and the extension 44. These teeth will be engaged by the pinion 47 which is associated with the gear 40.

Assuming the motor within the case 37 to be of the reversible type, it is apparent that when it rotates in one direction, it will move the shell and unit 24 from the position shown in Fig. 2 to that illustrated in Figs. 1 and 4. Conversely, when rotation in the opposite direction occurs, the lamp will be moved from projected position to fully retracted position. In order to arrest the mechanism in any intermediate position, a spring-pressed plunger 48, as shown in Fig. 10, may be employed. This plunger will extend into the spaces between the pole pieces 41. When, however, the coil 49 is energized, the plunger will be retracted. Under these circumstances, the motor shaft will be free to rotate.

In a mechanism of this type, it is extremely desirable that the pilot or other operator shall be required to only supervise to a minimum extent the operation of the unit. Therefore, and according to the present invention, the filaments of the unit 24 will be energized when this unit has, for example, been shifted 10° from fully retracted position. This energization will continue until the unit has been fully projected and again until it has been retracted to substantially housed position. As it moves into the latter position, the filament is to be automatically de-energized. Accordingly, all that a pilot will have to do will be to control the operation of the motor mechanism; the operation of the unit 24 following as an incident to such control.

As has been especially shown in Fig. 8, the extension of the bracket 44 may be drilled as indicated at 50 to provide a channel for that lead 26 which is not grounded. This lead is connected to a terminal 51 mounted by the extension. The terminal, as shown in Fig. 9 is insulated at 52 from the extension 44. This terminal may form a part of a spring-pressed brush 53 which will move with the extension as the motor projects and retracts the latter. As will be observed in these figures, as well as in Fig. 2, the brush and its holder preferably extend at right angles to the arcuate rack provided by plates 45 and extension 44. Also, as shown in Fig. 1, a cover 54 is conveniently furnished for the housing 56 which encloses the control mechanism and this cover mounts a contact strip 55 to be traversed by the brush 53. It is to be understood that, as shown in Fig. 1, the cover has, for the purposes of illustration, been removed but will normally be reversed and occupy a position upon the housing 56.

Thus, the brush will be in electrical contact with the contact strip 55 as the lamp is projected and retracted. Also, it will be observed that a lead 57 extends from the strip 55 to a switch assembly 58. This switch assembly includes an actuating arm 59 which controls the engagement and separation of contacts 60. When sufficiently moved, this arm will in turn cause a subsequent opening of contacts 61 forming a part of the switch assembly. The entire assembly may be pivotally supported as at 62 and adjustably secured against movement as indicated at 63.

As will be apparent, the actuating arm 59 extends in the path of travel of the brush 53 and holder therefor. Therefore, as this brush moves to a point adjacent one of its limits of travel, the arm 59 will be engaged. This will cause a separation of contacts 60. Continued movement of the arcuate rack together with the brush will cause further movement of the arm 59 or its equivalent and, thus, a separation of contacts 61. As shown, the lead 57 extends from the contact strip 55 to the pair of arms with which the contacts 60 are associated. Therefore, it is apparent that an initial movement of the actuating arm 59 will cause a separation of the contacts 60 and, consequently, an interruption of current flow to the filaments of the unit 24.

Adjacent the opposite end of the housing 56, a switch assembly 64 is mounted. Extending from the latter is an insulated actuating arm 65 which projects into the path of travel of the brush holder. A clamping bolt 66 may normally secure the switch assembly against movement. In any event, the movements of the latter are confined preferably by means of rail portions 67 between which it slides. As shown in Fig. 12, the nut 66' mounted by the bolt may also be confined between rail portions 67'. As will be apparent, the lamp, upon reaching a fully projected position, will open the contacts 68 of the assembly 64. This will be because the brush holder will have moved into engagement with the actuating arm 65 to effect this result. At the same time, by regulating the position of the assembly 64 by adjusting the latter along the rails 67, the point at which the contact 68 separates may be accurately established. Conversely, by swinging the assembly 58 around its pivot 62, the point at which the brush holder will engage the arm 59 may (within limits) be also varied. In conclusion, and before departing from the consideration of these figures, it will be observed that leads 69, 70 and 71 may extend from a plug 72 which, as illustrated in Fig. 2, may cooperate with a socket or plug-receiving member 73.

Next turning to Fig. 11, which diagrammatically illustrates the circuit which is preferably employed, it will be noted that the numeral 72' indicates a lead which extends from a suitable source of current supply (not shown). A switch 73' is interposed in this lead and is of the manually controlled type. Preferably, it is a single pole double throw switch. A lead 75 may be coupled to the lead 72' and by-pass this switch so as to be in electrical connection with lead 70. A further lead 74 is preferably grounded. In connection with the latter lead, it will be appreciated that this current path may be in the nature of an armored cable which encircles the leads 69, 70 and 71. This cable has not been shown but preferably extends from the manual switch 73'.

The motor 37 is provided with a pair of field coils 76 and 77. As shown in full lines in Fig. 11, the switch 73' may supply current directly from lead 72' through lead 71 and thence through switch 68 to coil 77 and so through the brushes of the motor through the coil 49 and thence to the ground. Simultaneously, current will be supplied through lead 75 which is, in effect, identical with lead 70 and thence, if the switch 60 is in closed position, through the brush 53, contact strip 55 and unit 24. The switch 60 formed of the corresponding contact points shown especially in Fig. 1 will, of course, not be closed until the motor 37 has operated to a certain extent. Consequently, the unit 24 will not be energized until it and the shell have been projected to a position, for example, 10° beyond the fully housed position as shown in Fig. 2. This operation of the parts will continue until the pilot either opens the switch 73' or else the travel of the brush assembly 53 causes the switch 68 to be opened. In the interim, the switch 61 will have been closed. It is to be assumed that with the opening of switch 68, the lamp unit has been fully projected.

In any event, if the switch 73' is shifted to the position shown in dash lines, it will be understood that current will flow through the contacts 61 to the coil 76. Simultaneously, the coil 49 will be energized. The motor will now operate to drive the pinion in a reverse direction. This movement may continue until unit 24 and its shell have been fully retracted. Under such conditions and with the contacts 68 again having been closed, the switch 61 would be open. This, of course, would occur only after switch 60 had been opened to accordingly de-energize unit 24. If the pilot had theretofore stopped the operation of the motor 37 before the parts had been shifted to either one of their extreme positions and if he thereupon desired to continue to shift them in the same direction as they had last been shifted, it is obvious that he could accomplish the desired results by simply again closing the switch 73' in the position which it had occupied when the initial operation was effected.

As will be apparent from the foregoing, all that a pilot will have to do will be to control the switch 73' and this will control not alone the direction of movement of the unit 24 but will also automatically control the brake or arresting mechanism. Additionally, it will control the energization of the filament. Any adjustments which may be necessary may readily be achieved by simply shifting the assembly 64 after loosening the securing member 66 and also swinging the assembly 58 after loosening the securing means 63. Ordinarily, the latter assembly will not have to be shifted even when the parts are being set up initially for operation. However, having in mind inequalities of manufacturing procedures, it is preferred that adjustment provision be contemplated so that no difficulties or bending of the parts will be necessary.

It will also be appreciated that by means of the present construction, no dependence is placed on interrupting the circuit by having the brush simply ride beyond the contact strip. In other words, electrical contact between the brush and the strip occurs at all times; the circuit being interrupted through the switch assembly. Consequently, the unit 24 may be of high wattage and relatively high voltage may be employed without any danger of arcing occurring between the brush and contact strip.

Finally, as will be noted in Fig. 13, the coils 76 and 77 for the motor may conveniently be provided by wires 77' and 78. These wires in being wound to furnish the coils may be disposed so that adjacent convolutions are provided by the different wires. In this manner, both fields will, in effect, occupy the same space instead of being arranged, for example, in the form of outer and inner concentric layers. One of the wires may be insulated and the other bare as shown and the aggregate coil may be enclosed in a sleeve 79 of insulating material. In this manner, a very simple and economical construction is provided and entire dependence may be placed upon the operation of the unit free from any difficulties.

As will be understood aside from the heretofore enumerated advantages, a lamp embodying the present construction may be furnished by a plurality of separate sub-assemblies which may be separately tested. After such testing, they may readily be assembled in larger or in the complete unit. A minimum of manual effort will be required in that, for example, referring to Fig. 12, the rail portions 67' will prevent rotation of the nut 66'. Consequently, all that an operator will have to attend to after he has once mounted the nut on the threads of the bolt is to rotate the latter; this assuring a complete tightening and locking of the parts.

As afore brought out and as a consequence of the laminated structure of the rack, it is feasible to reduce weight at this point to a minimum and to broach the teeth of the entire laminated structure after such structure has been assembled. In this manner and aside, again, from the question of economy of manufacture, a unit is furnished which will have an entirely satisfactory operative life.

Thus, among others, the several objects of the invention as specifically afore noted are achieved. Obviously, numerous changes in construction and rearrangements of the parts might be resorted to without departing from the spirit of the invention as defined by the claims.

I claim:

1. A lamp assembly to normally be contained within an enclosing structure defined by a sheet of material formed with an opening, said lamp assembly including in combination a housing body, a flange extending from said body and to bear against the outer surface of said material sheet adjacent the opening thereof, the body of said housing extending through said opening and into said structure, a shell to receive an illuminable element, means for movably supporting said shell with respect to said housing, means for securing said housing against removal with respect to said sheet, a motor driven pinion rotatably connected to said housing, an arcuate rack member secured to said shell and in engagement with said pinion, and whereby—upon rotation of the latter—said shell may be retracted within said housing and structure and projected beyond the same, and said rack comprising a laminated body including a substantially central layer of relatively lightweight and quick-wearing material, and outer relatively thin and hard layers of wear-resisting material.

2. A lamp assembly to normally be contained within an enclosing structure defined by a sheet of material formed with an opening, said lamp assembly including in combination a housing, means for securing the outer end of said housing to said sheet adjacent the opening thereof, the body of said housing extending through said opening and into said structure, a shell, means for movably supporting said shell with respect to said housing and whereby said shell may be retracted within said housing and structure and projected beyond the same, an illuminating unit to be disposed in said shell, said unit comprising an electrically energizable element and a glare shield extending to one side of the same, spaced projections forming a part of said unit, said shell being formed with recesses spaced a distance substantially one-half the spacing distance of said projections whereby the projections of said illuminating unit may—with the latter applied to said shell—extend into certain of said recesses, and said illuminating unit may, moreover, be axially rotated through 180° to cause its projections to extend into others of said recesses; said shield thereby assuming a position substantially opposite to that which it theretofore occupied, and means for securing said illuminating unit against rotation with respect to said shell in either of such positions.

3. A lamp assembly to normally be contained within an enclosing structure defined by a sheet of material formed with an opening, said lamp assembly including in combination a housing, means for securing the outer end of said housing to said sheet adjacent the opening thereof, the body of said housing extending through said opening and into said structure, a shell, means for movably supporting said shell with respect to said housing and whereby said shell may be retracted within said housing and structure and projected beyond the same, an illuminating unit to be disposed in said shell, said unit comprising an electrically energizable element and a glare shield extending to one side of the same, spaced projections forming a part of said unit, said shell being formed with recesses spaced a distance substantially one-half the spacing distance of said projections whereby the projections of said illuminating unit may—with the latter applied to said shell— extend into certain of said recesses, and said illuminating unit may, moreover, be axially rotated through 180° to cause its projections to extend into others of said recesses; said shield thereby assuming a position substantially opposite to that which it theretofore occupied, resilient cushioning means for yieldingly resisting the entry of said projections into said recesses, and a bezel for maintaining said lamp unit in position within said shell and with said resilient means under compression.

C. E. MEYERHOEFER.